V. LE CARPENTIER.
MACHINE FOR THE MANUFACTURE OF PLAITED CABLES OF TRAPEZOIDAL SECTIONS.
APPLICATION FILED NOV. 25, 1916.

1,318,888.

Patented Oct. 14, 1919.
5 SHEETS—SHEET 1.

INVENTOR
VICTOR LE CARPENTIER
BY
ATTORNEYS

V. LE CARPENTIER.
MACHINE FOR THE MANUFACTURE OF PLAITED CABLES OF TRAPEZOIDAL SECTIONS.
APPLICATION FILED NOV. 25, 1916.

1,318,888.

Patented Oct. 14, 1919.

5 SHEETS—SHEET 2.

INVENTOR
VICTOR LE CARPENTIER
BY
ATTORNEYS

V. LE CARPENTIER.
MACHINE FOR THE MANUFACTURE OF PLAITED CABLES OF TRAPEZOIDAL SECTIONS.
APPLICATION FILED NOV. 25, 1916.

1,318,888.

Patented Oct. 14, 1919.

5 SHEETS—SHEET 3.

INVENTOR
VICTOR LE CARPENTIER
BY Hyman and Hyman
ATTORNEYS

V. LE CARPENTIER.
MACHINE FOR THE MANUFACTURE OF PLAITED CABLES OF TRAPEZOIDAL SECTIONS.
APPLICATION FILED NOV. 25, 1916.
1,318,888.
Patented Oct. 14, 1919.
5 SHEETS—SHEET 4.
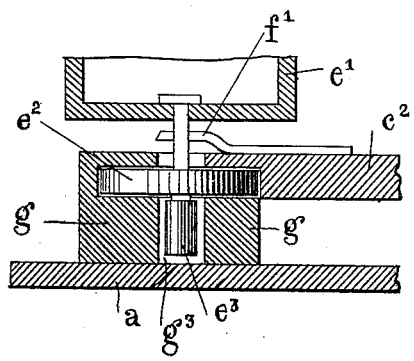
Fig. 5ᵃ
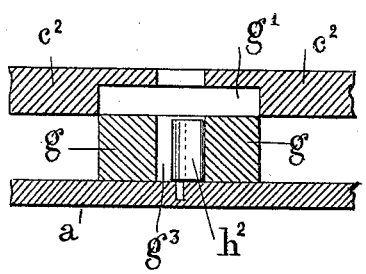
Fig. 5ᵇ
INVENTOR
VICTOR LE CARPENTIER
BY
ATTORNEYS V. LE CARPENTIER.
MACHINE FOR THE MANUFACTURE OF PLAITED CABLES OF TRAPEZOIDAL SECTIONS.
APPLICATION FILED NOV. 25, 1916.

1,318,888. Patented Oct. 14, 1919.
5 SHEETS—SHEET 5.

INVENTOR
Victor Le Carpentier
BY *Attorneys*

UNITED STATES PATENT OFFICE.

VICTOR LE CARPENTIER, OF GRAVILLE SAINTE HONORINE, FRANCE, ASSIGNOR TO LA SOCIÉTÉ ANONYME "CORDERIES DE LA SEINE," OF LE HAVRE, FRANCE, A CORPORATION OF FRANCE.

MACHINE FOR THE MANUFACTURE OF PLAITED CABLES OF TRAPEZOIDAL SECTIONS.

1,318,888.     Specification of Letters Patent.     Patented Oct. 14, 1919.

Application filed November 25, 1916. Serial No. 133,376.

*To all whom it may concern:*

Be it known that I, VICTOR LE CARPENTIER, a citizen of the Republic of France, and resident of Graville Sainte Honorine, Seine Inférieure, France, have invented new and useful Improvements in Machines for the Manufacture of Plaited Cables of Trapezoidal Sections, of which the following is a specification.

The present invention relates to a plaited cable, of trapezoidal section, composed of six strands or of a multiple of six strands, and to the machine which serves to manufacture this cable.

The cable is formed with three strands twisted to right and three strands twisted to left by means of a plaiting machine forming two circuits, the plaiting being carried out in such a manner that one strand of one of the circuits crosses successively two strands of the second circuit, then a single strand of the latter, and so on, in such a way as to afford the trapezoidal section. By reason of this shape, the cable will exactly assume or follow the two sides of the V-shaped groove of the pulley or flywheel. This kind of cable will have the maximum gripping surface and its slip will be reduced to a minimum; it will thus wear out less quickly than other known cables and will better transmit the driving power.

Figure 1:
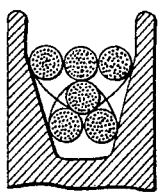
Figure 6:
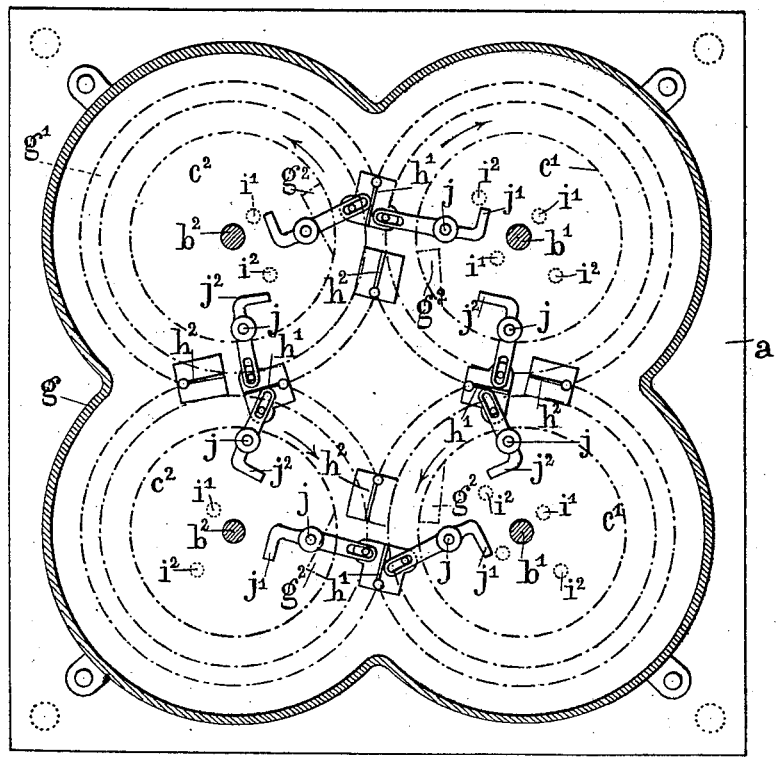
Figure 2:
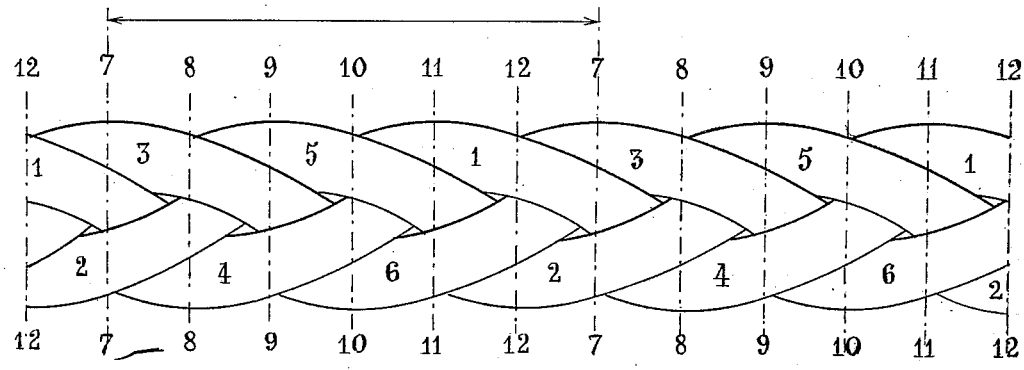
Figure 3:
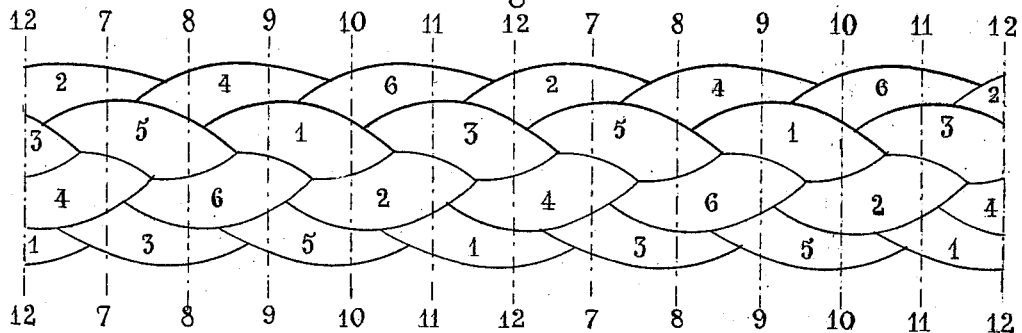
Figure 5:
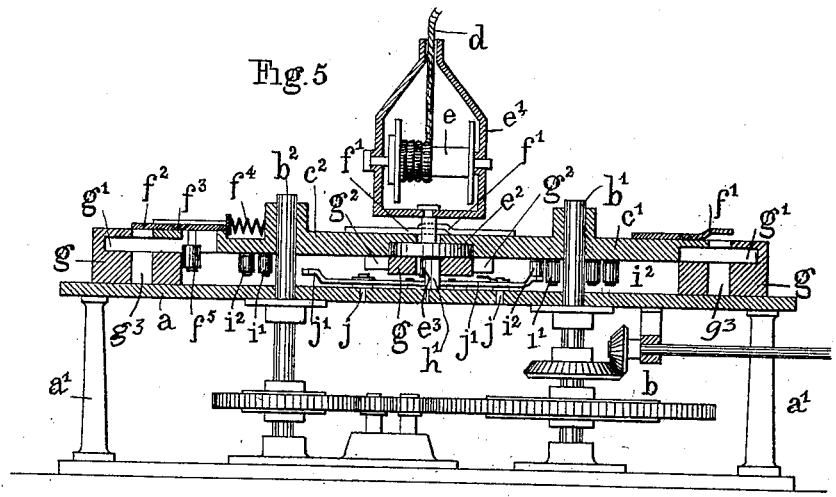
Figure 4:
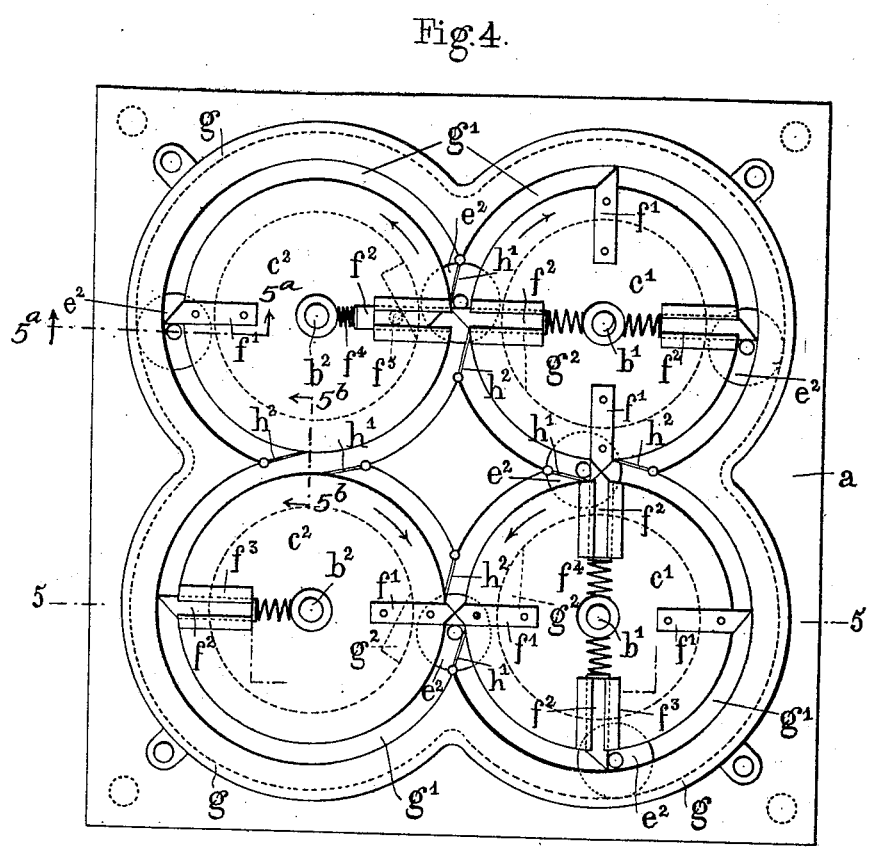

In the annexed drawings, Figure 1 is a transverse section of the cable in a grooved pulley. Fig. 2 is a plan view from above. Fig. 3 is a plan view from below. Fig. 4 is a plan from above, of the machine adapted to manufacture this cable. Fig. 5 is a vertical section on broken line 5—5 of Fig. 4. Figs. $5^a$ and $5^b$ are vertical sections respectively on the lines $5^{a'}$—$5^a$ and $5^{b'}$—$5^b$ of Fig. 4. Fig. 6 is a horizontal view in plan, the upper plates of the machine being supposed removed. Figs. 7 to 12 show diagrammatically the movements of the spools which carry the strands, during the plaiting of the cable.

The cable is plaited by means of 6 strands, or of a multiple of six strands (small cables), three of these strands being twisted to the right, three others to the left; they are supported by spools which follow two circuits; the spools which carry the strands 1—3—5 pass around one of the circuits, the spools carrying the strands 2—4—6 traveling around the other. As will be understood from Figs. 2 and 3, each strand of a circuit crosses in succession two of the other circuit, then a single strand of the latter, and so on, thus yielding a cable of trapezoidal section (Fig. 1) which conforms to the shape of the pulley groove.

The machine serving to make this cable comprises a frame $a$ supported by standards $a'$ and in which are mounted 4 vertical shafts supported by brackets or sockets. These shafts are driven in any suitable manner by a set of gears $b$ in such a way as to communicate to two of them, viz. the left hand shafts $b^2$, a speed which is double that of the two right hand shafts $b'$. Upon each of these shafts is keyed a horizontal plate turning constantly in the same direction, the left hand plates $c^2$ turning at a speed double that of the right hand plates $c'$. The strands $d$ are carried by spools $e$ journaled in boxes $e'$ beneath which are secured disks $e^2$. These disks travel in circular raceways $d'$ which are formed partially by recessing the fixed plates $g$ supported on table $a$, and in part by the space afforded between the plates $g$ and the rotary tables $c'$ and $c^2$ (Figs. 5, $5^a$ and $5^b$). Below the vertical axis of each disk $e^2$ is mounted a roller $e^3$, which, during the travel of the boxes $e'$ guided by the disks $e^2$ in the raceways $g'$, travels in the circular guide slot $g^3$ cut in the fixed plates $g$ beneath and communicating with the circular raceways $g'$.

The plates $c'$ and $c^2$ are furnished with arms serving to drive the frames $e'$ which support the spools $e$; there are only two of these arms upon the plates $c^2$ turning at high speed, while there are four of them on the plates $c'$. There are two kinds of driving arms; the arms $f'$ are fixed, while the arms $f^2$ are movable, being able to slide horizontally in the slides $f^3$, thereby compressing a coiled spring $f^4$ when the rollers $f^5$ fixed below these arms $f^2$ and through the rotation of the plates $c'$ and $c^2$ meet the inclined planes $g^2$ secured laterally to the fixed plate $g$ between the plates $c'$ and $c^2$.

The spools $e$ driven by the arms $f'$ and $f^2$ of the revolving plates $c'$ and $c^2$ follow predetermined paths or circuits around these plates, being guided in the groove $g'$. The transfer of the spools $e$ from one of the plates $c'$, $c^2$ to the other is controlled by the switch points $b'$ and $b^2$ arranged at points of intersection of the raceways $g'$ and guideways $g^3$. The switch points $h^2$ are actuated, when the spools approach these cross over points, by the rollers $e^3$ associated with each of the spool carriers (Figs. 5ª and 5ᵇ). The switch points thus engaged by the rollers oscillate to the right or left, inasmuch as the disks $e^2$ are not at this point readily held in their guideways against lateral movement by reason of the fact that the guideways merge adjacent the cross over points. The shifting of the points $h'$ is controlled by rollers $i'$ and $i^2$ placed below the revolving plates $c'$ and $c^2$; those rollers by reason of the rotation of the plates, abut against the arms $j'$ and $j^2$ pivoted at $j$ upon the frame $a$, these arms, as they move, causing the movement of the points $h'$ to which they are connected by a slide acting on an axis of the points; they bring these to the desired position in such a way that the spools cannot change their course and must follow that which is imposed upon them. The rollers $i'$ acting upon the arms $j'$ are arranged nearer the shaft $b'$ or $b^2$ than the rollers $i^2$ which act upon the arms $j^2$; the arms $j'$ are formed with a depressed portion at the place where the rollers $i^2$ must pass, so that there may be a free passage for said rollers $i^2$ which serve to actuate the arms $j^2$.

The high speed plates $c^2$ each comprise a roller $i'$ and a roller $i^2$ while the plates $c'$ each comprise two rollers $i'$ and two rollers $i^2$, in such a manner as to control the appropriate points at each crossing or passage of a spool from one plate to another, by the rotation of the plates themselves.

In order to permit the passage of a spool from the high speed plate $c^2$ to the low speed plate $c'$ (see the upper part of Figs. 4 and 6) or inversely, it is necessary that two movable arms $f^2$ of this plate should place themselves opposite one another; beforehand, by reason of the difference in speeds the driving arm $f^2$ of the plate $c'$ will find itself near the point of crossing before the arm $f^2$ of the high speed plate $c^2$, driving the guiding plate for the spool, will have arrived there. At this moment this arm $f^2$ of the plate $c'$ will be brought back to the rear in its slide $f^3$, thereupon compressing its spring $f^4$ for the roller $f^5$ will have struck the inclined plane $g^2$ by reason of the rotation of the plate $c'$; this arm $f^2$ will be moved so as to allow the spool to pass, driven by the arm $f^2$ of the high speed plate $c^2$. When the spool has passed the crossing point, the roller $f^5$ ceases to abut against the inclined plane $g^2$, the spring $f^4$ expands and the driving arm $f^2$ of the plate $c'$ resumes its first position.

The arm $f^2$ of the plate $c^2$ is, in its turn, brought back rearwardly, its roller $f^5$ meeting in its turn an inclined plane $g^2$; this arm $f^2$ releases the plate $e^2$ of the spool which is driven by the movable arm $f^2$ of the plate $c'$.

Figs. 7 to 12 show schematically the successive phases of cross over of the different spools in order to obtain the trapezoidal cable shown in Figs. 1, 2 and 3. In Figs. 2 and 3 the section lines 7—7, 8—8, 9—9, 10—10, 11—11 and 12—12 correspond respectively to the position of the cable strands in Figs. 7 to 12. These figures thus show a complete cycle of the plaiting operation. The spools carrying the strands 1, 3 and 5 (marked respectively 1—3—5 in these figures) pass around the circuit $x$, (shown in solid lines) while the spools carrying the strands 2—4—6 (marked 2, 4, 6) pass around the circuit $y$ (shown in broken lines).

Figure 7:
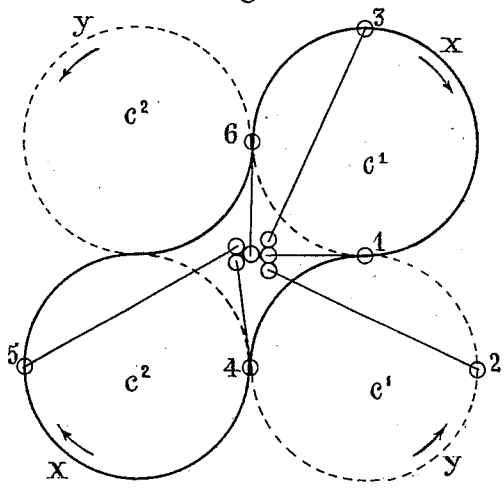

In Fig. 7, the spool 1 of the circuit $x$ crosses the spools 2 and 4 of the circuit $y$, then recrosses the spool 2 of the same circuit $y$.

Figure 8:
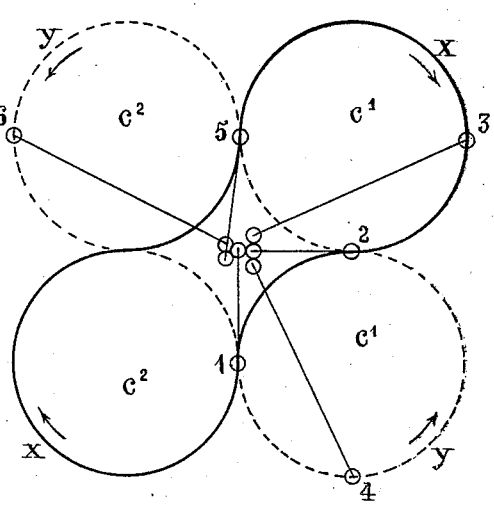

In Fig. 8, the spool 2 of the circuit $y$ crosses the spools 3 and 5 of the circuit $x$, then recrosses the spool 3 of the same circuit $x$.

Figure 9:
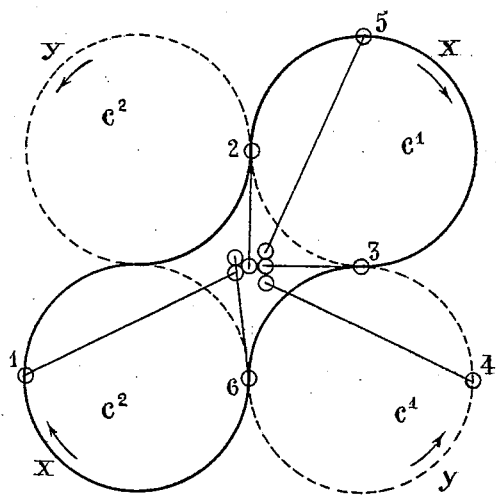

In Fig. 9, the spool 3 of the circuit $x$ crosses the spools 4 and 6 of the circuit $y$, then recrosses the spool 4 of the same circuit $y$.

Figure 10:
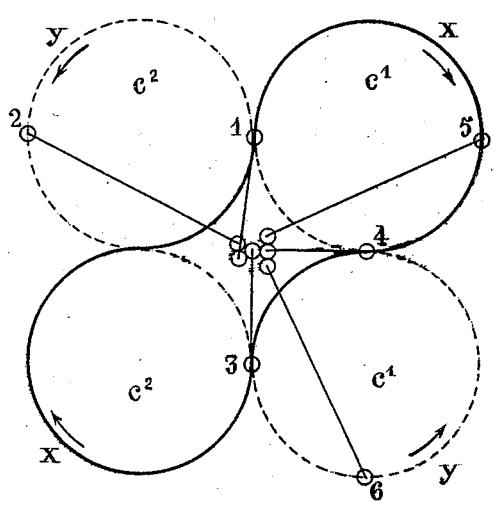

In Fig. 10 the spool 4 of the circuit $y$ crosses the spools 5 and 1 of the circuit $x$, then recrosses the spool 5 of the same circuit $x$.

Figure 11:
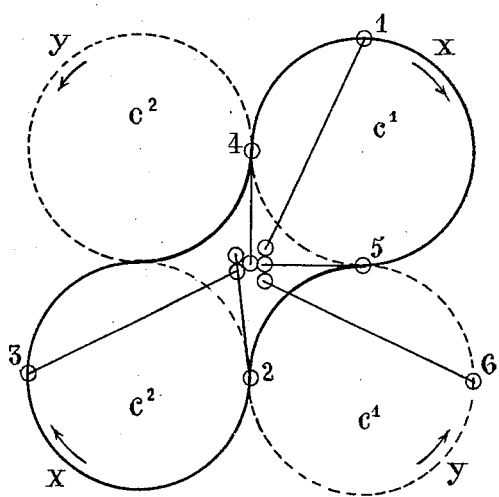

In Fig. 11 the spool 5 of the circuit $x$ crosses the spools 6 and 2 of the circuit $y$, then recrosses the spool 6 of the same circuit $y$.

Figure 12:
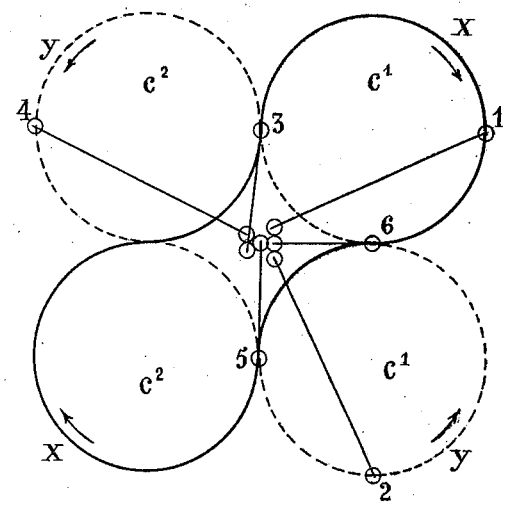

In Fig. 12 the spool 6 of the circuit $y$ crosses the spools 1 and 3 of the circuit $x$, then recrosses the spool 1 of the same circuit $x$.

The circuit afterward recommences in the same order. Naturally one might in place of forming the cable by means of 6 strands plait it by means of a multiple of 6 strands.

What I claim is:

1. A machine for the manufacture of a six strand plaited cable of trapezoidal section, comprising four rotary disks for driving the cable spools, a raceway surrounding each disk and communicating with the raceways of two other disks, six spool carriers moving in said raceways, means on the disks for driving said spool carriers in said raceways, means for driving two of said disks at twice the speed of the other two disks, and means for guiding the spool carriers from one raceway to another in predetermined order to form two three-strand circuits of opposite direction and to cause each strand in succession of each circuit to first cross two strands of the opposite circuit and then recross a single strand thereof, substantially as described.

2. In a construction such as specified in claim 1, movable arms on the driving disks for engaging the spool carriers, cams engaging certain of said arms to move the same out of operative position momentarily at the junction of the raceways for disks rotating at different speeds, switch points for diverting the spool carriers from one raceway to another and means carried by the disks for operating said switch points.

In testimony whereof I have signed my name to this specification, in the presence of two subscribing witnesses.

VICTOR LE CARPENTIER.

Witnesses:
A. V. CHEUIQUUZ,
G. N. WINNER.

Copies of this patent may be obtained for five cents each, by addressing the "Commissioner of Patents, Washington, D. C."